Oct. 21, 1930.  J. PAVLECKA  1,779,186
AIRCRAFT POWER PLANT
Filed Sept. 27, 1928
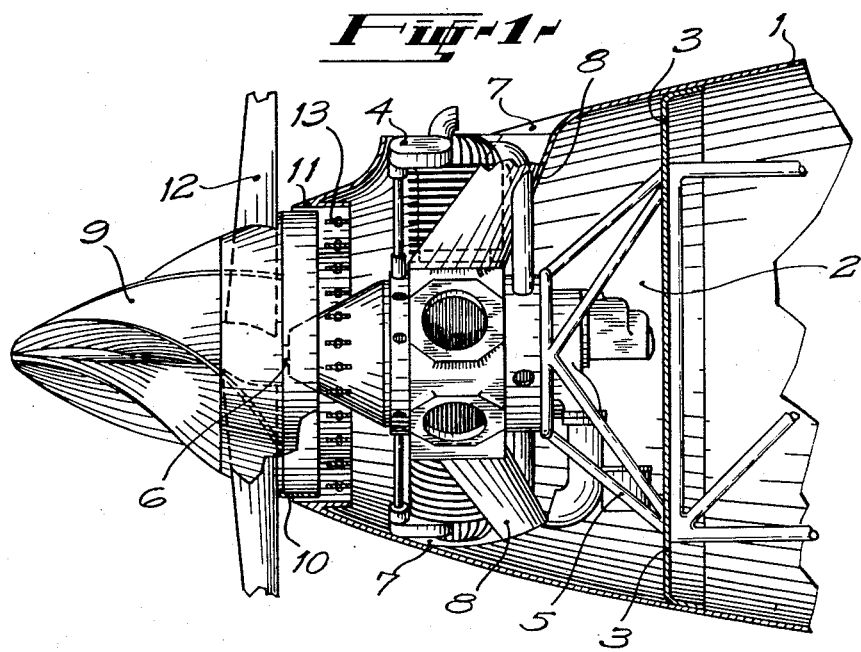
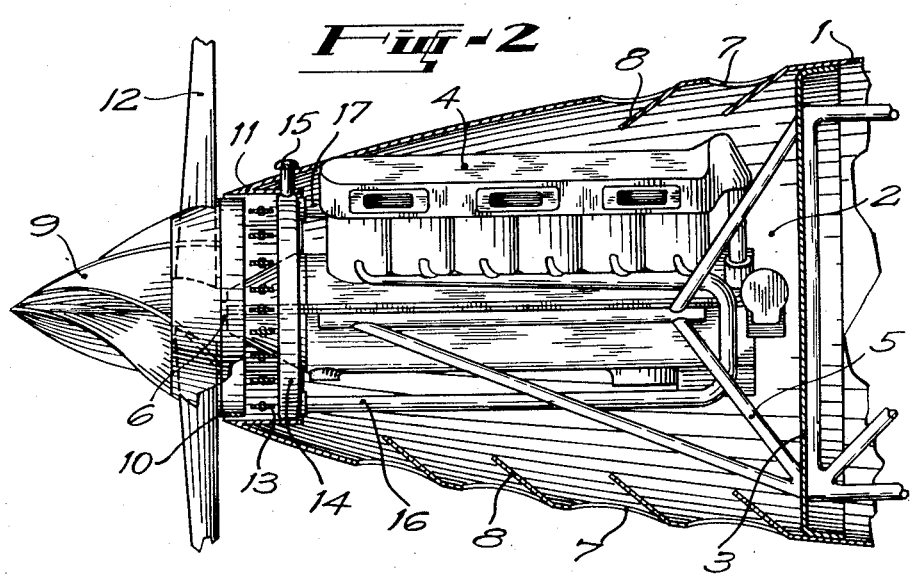
INVENTOR
Jan Pavlecka Patented Oct. 21, 1930

1,779,186

UNITED STATES PATENT OFFICE

JAN PAVLECKA, OF WYANDOTTE, MICHIGAN

AIRCRAFT POWER PLANT

Application filed September 27, 1928. Serial No. 308,630.

My invention relates more particularly to the cooling of aircraft power plants.

In aircraft and other power plants, air is the final medium for dissipating the waste heat therefrom; in the existing state of the art of cooling aircraft power plants, the necessary air is supplied by virtue of the motion of aircraft through the atmosphere, and all the surfaces that require cooling, such as ribbed cylinders, water and oil radiators and crankcases, must be fully exposed in the induced slipstream on the outside of aircraft. This fact constitutes a serious drawback in performance of aircraft since the exposed cylinders, radiators, etc., represent the most parasitic and least desirable protrusions on the streamline bodies of airplanes and airships.

A further deficiency of the present cooling systems is their excessive weight and bulkiness; if their heat dissipating capacity could be increased, their weight and size could be reduced in proportion, or viewed from another standpoint, the output and the efficiency of the engines could be raised by advancing the compression ratio thereof.

Realizing the aforementioned deficiencies and limitations of cooling aircraft power plants in the natural stream of air, I have devised a new means whereby the cooling is effected more intensively and without impairing the streamlining of aircraft, and which, therefore, represents a distinct advance.

As one of its objects, my invention has to provide a positive and controllable forced or induced supply of air into the aircraft for cooling engine cylinders, radiators, etc., enclosed therein.

Another object of my invention is to improve the streamlining of aircraft bodies and to reduce their resistance by eliminating all cooling surfaces from their exterior.

A still further object of my invention is to reduce the weight and size of cooling apparatus on aircraft by increasing the rate of heat transfer thereof through more intensive supply of air thereto.

An important object of my invention is to provide forced ventilation for the power plant compartment in aircraft, and thus reduce the fire hazard.

A still further object is to make the use of air-cooled engines, having the cylinders arranged in one or more banks, practicable and thus achieve the advantage of low weight and compactness attendant to this type of engine.

The means through which the objects set forth hereinabove are accomplished will be described first in principle, and then in their structural form with reference to the drawing affixed to this specification and forming an integral part thereof.

While the principle of my invention, as disclosed herein further, is applicable to any thermal power plant for vehicle propulsion, the present description will be directed mainly to the two representative types that have been universally adopted so far, i. e., the air-cooled and the water-cooled internal combustion engines, and moreover, the water-cooled engine, wherein the heat is transferred to air through intermedium of water, will be treated as merely a special case of the air-cooled engine.

According to the provisions of my invention, the engine, together with its cooling apparatus, is enclosed entirely, or to the greatest practical extent, within the aircraft body which it propels, and instead of depending for its cooling on the outside slipstream, an artificial air current is forced through the engine compartment wherein it passes all objects at high velocity and abstracts heat therefrom; the air for this purpose is forced or induced into the power plant compartment at the forward end thereof, and after sweeping therethrough is discharged behind the engine.

It has already been proposed prior to this invention that the aforementioned scheme be resorted to for improving the cooling of aircraft power plants, and it has been attempted by merely providing a hole in the nose of aircraft and scooping the air, encountered within the diameter of said hole in flight, inwardly and forcing it, due to the dynamic impact thereon, through the engine compartment. This arrangement is obviously crude in conception, and in practice entails serious losses in performance of aircraft, and has never been adopted generally. An improvement over this primitive idea has been the adoption of an auxiliary propeller disposed behind the main tractive one, within the aforementioned hole in the nose of aircraft; but neither has this proved a success because such a small propeller or fan is incapable of accelerating the air impinging thereon, and besides, the streamlining of aircraft has not been improved thereby at all.

Now in the system of my invention, an air fan is also an essential feature supplying, as it does, the inward air current, but in contrast with prior practice the streamline form of aircraft is fully preserved, and the volume and velocity of air through the engine compartment are greatly augmented due to the fact that the fan is a rotary blower of the size and shape of the well-known spinner, and is preferably of one of the forms which have been made subject matter of my divisional applications Serial Nos. 304,505 and 304,506, both filed September 7th, 1928.

Besides making use of the abovementioned air blower of the streamline impeller type, my invention embodies further novelties in the manner of efficient utilization of the air delivered by said blower, and refinements in the structural embodiment of the principle set forth hereinabove.

An aircraft employing my invention comprises essentially an isolated compartment housing an engine and the cooling apparatus therefor, and having at one axial end a circular aperture and concentrical with the shaft of said engine. Outwardly completing the aircraft streamline form of the body is an air impeller of the specified type, which registers at its base with the circular aperture in said body, and is operatively conjoined to said engine shaft. In most cases, there is also a propeller mounted on the same shaft, in which case said impeller is adapted to embrace the hub portion thereof within its length and diameter.

In angular rotation the impeller gets hold of the air within its range without disturbing the flow thereof past said aircraft, and expels said air in an accelerated state into the engine compartment, wherein it is directed to the surfaces requiring its action, and then discharged outwardly through openings in the walls of said compartment.

In a system embodying an impeller of the specified type and form, the volume of air and its velocity and concentration are at least equal to those of the outside slipstream, the cylinders and the radiators disposed within the aircraft body obtain the same, if not greatly intensified cooling than they normally would on the outside, and moreover, oil is cooled in the crankcase and constant ventilation of the engine compartment is provided at the same time. The enclosure of all cooling surfaces will result in increased performance of aircraft which will more than compensate for the power expended for rotating the impeller; this is substantiated by the fact that the cylinders of an air-cooled engine, protruding from the aircraft in the well-known manner, account for as much as thirty per cent of the total resistance of aircraft, while accelerating a portion of the air normally displaced by the aircraft laterally, inwardly in an impeller of the specified class is estimated to absorb no more than five per cent of the total engine power.

Having now disclosed my invention in its basic form I proceed to describe two structural embodiments thereof as illustrated in the accompanying drawing, wherein Fig. 1 represents the installation of an air-cooled radial engine embodying my invention; this is a longitudinal cross-section through the aircraft body.

Fig. 2 is an installation of a water-cooled engine embodying my invention; this is likewise a longitudinal cross section; the engine shown therein has the cylinders "in line," and in that respect also demonstrates the application of my invention to an air-cooled engine characterized by the same arrangement of cylinders.

As has already been stated hereinbefore, there is no basic difference in the application of my invention to any type of power plant, air-cooled and water-cooled not excepting. The embodiment in Fig. 2 is presented merely to prove this fact, as it shows plainly that the added water radiator fits into the general arrangement of the elements of my invention without in any way altering the same.

Referring jointly to Figs. 1 and 2, 1 designates an aircraft body of streamline form comprising a power plant 4 in a compartment 2. At one axial extremity, the compartment 2 is isolated from the rest of the body 1 by a partition 3, which in most cases serves also as the usual fire-wall. At the other extremity, in the nose of the body 1, the compartment 2 terminates with a circular aperture comprising a cylindrical ring 11 coaxially with the power plant shaft 6 which extends outwardly therethrough. The shaft 6 in most cases is the propeller shaft, the propeller 12 being mounted thereon adjacent the aperture 11. Disposed in the wall of the compartment 2, about and behind the power plant 4, is a series of openings or louvres 7, and adjacent thereto on the inside of said compartment, an equal number of baffle plates 8.

Externally forming a streamline complement of the body 1, and centrally registering with the aperture 11 therein, is the air impeller 9 mounted on the same shaft 6 as the propeller 12; the propeller 12 assumes a position within the length of the impeller at the largest diameter thereof so as to present least obstruction to the air passing therethrough. The impeller 9 is essential for the purpose of this invention not only through its disposition at the aircraft body and its functional coordination with the other elements constituting this invention, but, moreover, through its distinct structural characteristics which only render the cooling system feasible and practical. Among these, the aforementioned conoidal profile contour forming the apex of the aircraft body is one of the principal. Disposed on or about the axis of the impeller 9 within said profile contour thereof are a plurality of vanes or blades angularly or radially convoluted in such a manner as to impart an axial velocity impulse to the air within their hold. The base of the impeller is open and its diameter corresponds approximately to that of the aperture 11 in the body 1, and provides a passageway for the air handled by the said vanes in either direction of rotation. Though the peripheral velocity of the impeller vanes is relatively small, their elongated surfaces, their gradually increasing radius of action along said profile contour, and their large pitch cooperate to an equal extent in taking hold of the whole volume of air within the diameter and the length of the impeller and increasing the velocity of said air in combined angular rotation and forward progression, or in angular rotation only, considerably above the velocity of entrance of said air, and in delivering a constant stream thereof into the aircraft body or withdrawing it therefrom.

A seal for preventing leakage of air is embodied between the impeller 9 and the body 1, and comprises, in the preferred form, two cylindrical rings 10 and 11 concentrically fitted one into each other with a small annular clearance thereinbetween; the outer ring 11 is integral with the body 1 at the aforementioned aperture therein and extends for a certain distance from said aperture into the compartment 2. The inner ring 10 is secured peripherally to the base of the impeller 9, and therefrom extends likewise into the compartment 2, but for a distance substantially shorter than said outer ring 11, whereby the latter provides a passageway for the air from said impeller beyond the inner ring 10.

For the purpose of controlling the temperature of the power plant 4, means for adjusting the volume of air delivered by the impeller 9 into the compartment 2 is provided by a plurality of shutters 13 disposed in the passageway of the ring 11 either vertically or horizontally, as shown; the shutters 13 are pivoted axially at their ends and operatively controlled from either the pilot's cockpit or automatically from a thermostatic device in the customary manner.

Referring now specifically to Fig. 1, the power plant 4 shown therein represents an air-cooled engine having a plurality of cylinders provided with cooling ribs and arranged radially about a crankcase on a mount 5. Two of the cylinders in the foreground are omitted in this view in order to reveal those in the background as better illustrative. The engine 4 may be of any standard type or make, or pursuant to this invention, engines can be specially designed to fit wholly, or from the greatest extent, into the body 1 so that no part thereof will protrude beyond the streamline contour of said body.

To the end that the air sweeping through the compartment 2 be applied most effectively to its purpose in connection with the engine 4, a baffle plate 8 is disposed about each cylinder enveloping the rear and the sides thereof and inclining away therefrom as extending from the crankcase of said engine outwardly to the opening 7, said opening being located substantially about and behind the head of each cylinder in the wall of compartment 2.

Referring now specifically to Fig. 2, the power plant therein represents a water-cooled engine having two banks of cylinders disposed in a V on a crankcase supported by a bearer 5. The water radiator 14, having an inlet 17, an outlet 16, and a filler 15, is located to the best advantage within the ring 11 just behind the shutters 13 therein.

Similarly as in Fig. 1, a series of baffle plates 8 are disposed in compartment 2 in Fig. 2, adjacent to openings 7 in the wall thereof.

Functionally, the cooling system of my invention, as disclosed in its structure hereinabove, affords simplicity and reliability in addition to increased performance of aircraft. In angular rotation, i. e., whenever the engine 4—Figs. 1 and 2—is running, the impeller 9 forces a continuous blast of air inwardly and axially through the passageway into the compartment 2. Simultaneously, a portion of the air sweeping past the outside of the impeller 9 will enter the annular clearance between the rotating ring 10 and the stationary ring 11, and due to the checked velocity thereof in between said rings, dynamic pressure will be established therein, which pressure will be equal to or greater than the pressure of the air flowing inwardly through the ring 11, and of a direction opposing any of said air inside from escaping through said clearance.

By means of the shutters 13 it is possible to adjust the passage so as to admit either the full amount of air from the impeller, or only a portion of it, or to shut it off completely, depending upon the requirements of the engine 4.

Before entering the compartment 2, in the case of the water-cooled engine in Fig. 2, the air admitted through the shutters 13 has to pass through the cellular core of the radiator 14, and in doing so, it carries away the heat therefrom due to its high velocity therethrough.

Thereafter, the air strikes the crankcase of the engine 4 (Figs. 1 and 2), and is diverged thereby as sweeping along its conical surface outwardly to the cylinders.

In the case of the air-cooled engine in Fig. 1, the air blast strikes the individual cylinders on the front side, and is directed backwardly therealong to the rear thereof by the plate 8, and then outwardly along said cylinder and said plate to the opening 7, and is discharged from the compartment 2 and from the hold of said baffle plate with the least interference, and to a certain degree with the assistance of the outside slipstream as slipping thereinto along the backwardly inclining surface of the plate 8. In its course around and along the cylinder, the air abstracts heat therefrom.

In the case of the water-cooled engine, the air is discharged from the engine compartment in the same way through openings 7, being guided thereto by the plates 8 inclining in the direction of the outside slipstream.

It is obvious to those versed in the art of aircraft design, and does not in any way violate the spirit of this invention, that the airflow, as traced through the aircraft body hereinabove, can be reversed in direction, i. e., the impeller 9 can be rotated so as to exhaust air by suction from the engine compartment 2, thereby inducing new air thereinto through the openings 7. Such is the case often when the aircraft is of the "pusher" type, progressing through the air with the propeller 12 and the impeller 9 in the rear of it, i. e., in the direction opposite to that assumed in the foregoing description.

Be it further stated that the principle of cooling aircraft power plants as disclosed hereinbefore is not limited to the exact embodiments illustrated in the drawing referred to. Among the great variety of installations to which my invention can be adapted one will be mentioned here as an example, viz., the power plant nacelle on airships and large airplanes wherein the power plant compartment constitutes a streamline body by itself; in this instance, it will be found of advantage to discharge the air or draw it in not only through openings in the wall of said nacelle but through the axial end opposite the impeller end as well. Many other modifications of like nature can be resorted to in the different applications of my invention without departing from the principle set forth in the foregoing description and in the appended claims.

What I claim is:

1. In an aircraft in combination, a body tapering to one axial extremity thereof and terminating with a circular aperture thereat, a power plant in said body having a shaft projecting axially through said aperture, and an air blower on said shaft adjacent to said aperture, said blower comprising a plurality of vanes disposed within and along a substantially conoidal profile contour forming a complement of said body to an apex and adapted to induce, in rotation, air through said aperture.

2. In an aircraft in combination, a body tapering to a circular aperture in one axial extremity thereof, a power plant in said body having a shaft projecting axially through said aperture, and an air impeller on said shaft, said impeller comprising a plurality of vanes disposed on and about the axis thereof between an apex and a base, said base registering with said aperture and said vanes forming in outline a faired continuation of said body therefrom to said apex.

3. In an aircraft in combination, a body having a circular aperture in one axial extremity thereof, a power plant in said body, and an air impeller having a substantially conoidal profile contour with an apex and a base and a plurality of vanes bordering along said profile contour between said apex and said base, said impeller registering at the base with said aperture and journalled to said power plant therethrough.

4. In an aircraft in combination, a body tapering along streamline contours to one axial extremity thereof and terminating with a circular aperture thereat, a power plant in said body having a shaft projecting axially through said aperture, and an air impeller on said shaft adjacent to said aperture, said impeller characterized by a plurality of vanes extending between an apex and a base along and within a substantially conoidal profile contour, said base of said impeller registering coaxially with said aperture, and said vanes forming in outline a streamline complement to said body from said aperture therein forwardly.

5. In an aircraft in combination, a body tapering to one axial extremity thereof and terminating with a circular aperture thereat, a power plant in said body having a shaft projecting axially through said aperture, an air impeller characterized by a substantially conoidal profile contour and a plurality of vanes on said shaft adjacent to said aperture, and a propeller on said shaft, said propeller positioned at said aperture with its hub portion within the length and the diameter of said impeller vanes.

6. In an aircraft in combination, a body having a circular aperture in one end thereof and an opening or openings distanced from said aperture, a power plant in said body between said aperture and said opening or openings therein, said power plant having a shaft projecting axially through said aperture, and an impeller characterized by a plurality of vanes extending between an apex and a base along and within a substantially conoidal profile contour, said impeller mounted on said shaft to register at its base with said aperture and adapted to induce, in rotation, air between said aperture and said opening or openings in said body.

7. In an aircraft in combination, a compartment having a circular aperture in one end thereof and an opening or openings distanced from said aperture, a power plant in said compartment between said aperture and said opening or openings therein, said power plant having a shaft projecting axially through said aperture, means in said compartment for directing air between said aperture and said opening or openings to and along said power plant therein, and an air impeller characterized by a plurality of vanes extending between an apex and a base along and within a substantially conoidal profile contour, said impeller mounted on said shaft to register at its base with said aperture and adapted to induce, in rotation, air between said aperture and said opening or openings in said compartment onto and along said directing means therein.

8. In an aircraft in combination, a compartment having a circular aperture in one end thereof and an opening or openings distanced from said aperture, a power plant in said compartment having a shaft projecting axially through said aperture, means for cooling said power plant disposed in said compartment anywhere between said aperture and said opening or openings therein, and an air impeller characterized by a plurality of vanes extending between an apex and a base along and within a substantially conoidal profile contour, said impeller mounted on said shaft to register at its base with said aperture and adapted to induce, in rotation, air between said aperture and said opening or openings in said compartment through and along said cooling means therein.

9. In an aircraft in combination, a compartment having a circular aperture in one end thereof and an opening or openings distanced from said aperture, a power plant in said compartment having a shaft projecting axially through said aperture, means for adjusting the passageway through said compartment between said aperture and said opening or openings therein, and an air impeller characterized by a plurality of vanes extending between an apex and a base along and within a substantially conoidal profile contour, said impeller mounted on said shaft to register at its base with said aperture and adapted to induce, in rotation, air between said aperture and said opening or openings in said compartment subject to said adjusting means therein.

10. In an aircraft in combination, a compartment having a circular aperture in one end thereof and an opening or openings distanced from said aperture, a power plant in said compartment having a shaft projecting axially through said aperture, a plurality of controllable shutters disposed in said compartment approximately at said aperture therein, and an air impeller characterized by a plurality of vanes extending between an apex and a base along and within a substantially conoidal profile contour, said impeller mounted on said shaft to register at its base with said aperture and adapted to induce, in rotation, air between said aperture and said opening or openings in said compartment in between said shutters therein.

11. In an aircraft in combination, a compartment having a circular aperture in one end thereof and an opening or openings distanced from said aperture, a power plant in said compartment having a shaft projecting axially through said aperture, a cellular radiator disposed in said compartment approximately at said aperture therein, and an air impeller characterized by a plurality of vanes extending between an apex and a base along and within a substantially conoidal profile contour, said impeller mounted on said shaft to register at its base with said aperture and adapted to induce, in rotation, air between said aperture and said opening or openings in said compartment through said radiator therein.

12. In an aircraft in combination, a compartment having a circular aperture in one axial extremity thereof, a power plant in said compartment having a shaft projecting axially through said aperture, an air impeller characterized by a substantially conoidal profile contour on said shaft adjacent to said aperture, openings in the walls of said compartment substantially around and behind said power plant therein, and a baffle plate disposed adjacent to each of said openings.

13. In an aircraft in combination, a compartment having a circular aperture in one axial extremity thereof, a power plant in said compartment having a shaft projecting axially through said aperture, an air impeller characterized by a substantially conoidal profile contour on said shaft adjacent to said aperture, and means between said impeller and said compartment for sealing the annular clearance thereinbetween.

14. In an aircraft in combination, a compartment having a circular aperture in one axial extremity thereof, a power plant in said compartment having a shaft projecting axially through said aperture, an air impeller characterized by a substantially conoidal profile contour on said shaft adjacent to said aperture, and two cylindrical rings fitted concentrically into each other with a relatively small annular clearance, the outer of said rings being secured to said compartment at and around said aperture therein and extended inwardly therefrom, and the inner ring being integral with said impeller at the base thereof.

15. In an aircraft in combination, a compartment having a circular aperture in one axial extremity thereof, a power plant in said compartment having a shaft projecting axially through said aperture, an air impeller characterized by a substantially conoidal profile contour on said shaft adjacent to said aperture, a cylindrical ring secured to said compartment at and around said aperture therein and extended inwardly therefrom as an air passageway, and a circular radiator disposed in said ring.

16. In an aircraft in combination, a compartment having a circular aperture in one axial extremity thereof, a power plant in said compartment having a shaft projecting axially through said aperture, an air impeller characterized by a substantially conoidal profile contour on said shaft adjacent to said aperture, a cylindrical ring secured to said compartment at and around said aperture therein and extended inwardly therefrom as an air passageway, a circular radiator disposed in said ring, and a plurality of controllable shutters disposed adjacent to said radiator.

17. In an aircraft in combination, a compartment having a circular aperture in one axial extremity thereof, a power plant in said compartment having a shaft projecting axially through said aperture, an air impeller characterized by a substantially conoidal profile contour on said shaft adjacent to said aperture, cooling means for said power plant disposed in said compartment, openings in the walls of said compartment substantially around and behind said power plant therein, means for directing air from said impeller to said openings around said power plant, controllable means for adjusting the volume of air from said impeller, and means for sealing the annular clearance between said impeller and said compartment.

18. In an aircraft in combination, a compartment having a circular aperture in one axial end thereof, an engine in said compartment comprising a plurality of cylinders and a shaft protruding centrally and outwardly through said aperture, an air impeller forming a streamline complement to said compartment, mounted on said shaft concentrically with said aperture, a propeller mounted on said shaft at said aperture conjointly with said impeller, a cylindrical ring within said compartment extending axially and inwardly of said aperture therein, means for sealing the clearance between said impeller and said ring, openings in the walls of said compartment substantially around and behind said engine therein, and a baffle plate disposed adjacent to each of said openings.

19. In an aircraft in combination, an isolated compartment having a circular aperture in one axial end thereof, an engine in said compartment comprising a crankcase and a plurality of cylinders arranged radially thereabout, a shaft from said engine protruding centrally and outwardly through said aperture, an air impeller constituting in outline, a streamline complement to said compartment, mounted on said shaft and registering, at its base, with said aperture, a propeller mounted on said shaft at said aperture in conjunction with said impeller, an air seal between said impeller and said compartment comprising two cylindrical rings fitted concentrically into each other and secured, the inner one peripherally to said impeller and extended into said compartment therefrom, and the outer one to said compartment at and around said aperture therein and extended axially and inwardly therefrom for a distance substantially longer than said inner ring, a plurality of controllable shutters disposed within said ring, an opening in the wall of said compartment substantially about and behind each of said engine cylinders, and a baffle plate extending along and about each of said cylinders between said crankcase of said engine and said opening in said compartment.

20. In an aircraft in combination, an isolated compartment having a circular aperture in one axial end thereof, an engine in said compartment comprising a crankcase and a plurality of cylinders arranged thereon in line, a shaft from said engine protruding centrally and outwardly through said aperture, an air impeller constituting in outline a streamline complement to said compartment mounted on said shaft and registering, at its base, with said aperture, a propeller mounted on said shaft at said aperture in conjunction with said impeller, an air seal between said impeller and said compartment comprising two cylindrical rings fitted concentrically into each other and secured, the inner one peripherally to said impeller and extended into said compartment therefrom, and the outer one to said compartment at and around said aperture therein and extended axially and inwardly therefrom for a distance substantially longer than said inner ring, a plurality of controllable shutters disposed within said outer ring, a cellular radiator disposed adjacent to said shutters, openings in the wall of said compartment substantially about and behind said engine therein, and a backwardly inclining baffle plate disposed adjacent to each of said openings.

In testimony whereof I affix my signature.

JAN PAVLECKA.